UNITED STATES PATENT OFFICE.

BERNHARD FRIEDLAENDER, OF SEBEWAING, MICHIGAN, ASSIGNOR TO AMERICAN MARMORITE COMPANY, OF SAGINAW, MICHIGAN.

COMPOSITION.

932,460.  Specification of Letters Patent.  Patented Aug. 31, 1909.

No Drawing.   Application filed January 21, 1908.   Serial No. 412,006.

*To all whom it may concern:*

Be it known that I, BERNHARD FRIEDLAENDER, a citizen of the United States of America, residing at Sebewaing, in the county of Huron and State of Michigan, have invented new and useful Improvements in Compositions, of which the following is a specification.

The invention relates to a new and improved composition for wood facing and floor coverings, and in use provides an artificial marble covering which may be readily and conveniently applied.

The main object of the present invention is the provision of a composition which may be applied to any desired surface and form a seamless covering which is fire, acid, and water proof and is capable of being highly polished.

In carrying out the invention I make use of burned magnesite, solution of magnesium chlorid, sawdust, turpentine and desired coloring matter, adding to these ingredients in one form of the composition asbestos fiber.

In the simpler form of the composition the ingredients are in the following proportions:

Magnesite_____ 25 parts
Sol. magnesium chlorid 21 Baumé_ 25 parts
Fine sawdust, 4 parts impregnated
  with a sol. of Venetian turpentine _____ 4½ parts
Coloring matter_____ 15 parts In the use of the asbestos fiber in the composition the proportions are as follows:—

Magnesite_____ 40 parts
Sol. magnesium chlorid, 19 Baumé_ 33 parts
Asbestos fiber_____ 10 parts
Fine sawdust_____ 5 parts
Coloring matter_____ 1 to 15 parts In connection with the compositions described I have found it desirable in use with those surfaces incapable of absorption, that a suitable filling be used, with which the composition will associate itself to form a better juncture. This filling is composed of burned magnesite, a solution of magnesium chlorid, and a body composed either of dampened sawdust, fine cork, fine wood ashes or sand.

With ten parts of the dampened sawdust in one form of the filler I use fifteen parts of magnesite and ten parts of the magnesium chlorid; with four parts of the fine cork for another form of the filler I use twenty parts of the magnesite and fifteen parts of the magnesium chlorid. With the filler using the fine wood ashes, of five parts in quantity I use five parts of the magnesite and three parts of magnesium chlorid; while with the sand filler, in which there is used twenty-eight parts of sand, I use twelve parts of magnesite and 16¼ parts of magnesium chlorid.

The composition is readily applicable to any surface, being applied in the form and consistency of plaster or cement. In use with those surfaces in which a filling is desirable any of the above noted fillers may be used, the distinctive ingredient of each filler controlling its use with particular surfaces.

The composition is preferably put up in powdered form, and when applied forms an acid, fire and water proof covering which is seamless and is an effective non-conductor of heat or cold. Of course, the character of the coloring matter can be varied to suit the particular scheme of decoration where it may be used.

The composition as such may also be molded in the form of briquets, tiles, plates, or other ornamental articles.

Having thus described the invention, what is claimed as new, is:—

1. The herein described composition comprising burned magnesite, magnesium chlorid solution, fine sawdust impregnated with a solution of Venetian turpentine, and coloring matter.

2. The herein described composition comprising twenty-five parts of burned magnesite, twenty-five parts of magnesium chlorid solution, four parts of fine sawdust impregnated with a solution of four and one-half parts of Venetian turpentine and coloring matter.

In testimony whereof I affix my signature in presence of two witnesses.

BERNHARD FRIEDLAENDER.

Witnesses:
  E. O. RUPPERT,
  J. BLUMENTHAL.